United States Patent [19]
McMurdie et al.

[11] Patent Number: 6,083,373
[45] Date of Patent: Jul. 4, 2000

[54] ELECTRODEPOSITION BATHS CONTAINING CALCIUM SALTS

[75] Inventors: Neil D. McMurdie, Pittsburgh; Alan J. Kaylo, Glenshaw; Richard F. Karabin, Ruffs Dale, all of Pa.

[73] Assignee: PPG Industries Ohio, Inc., Cleveland, Ohio

[21] Appl. No.: 09/113,664

[22] Filed: Jul. 10, 1998

[51] Int. Cl.$^7$ .................................................... C25D 13/10
[52] U.S. Cl. ...................... 204/489; 204/505; 204/506; 523/415
[58] Field of Search ............................. 523/415; 204/499, 204/505, 506, 489

[56] References Cited

U.S. PATENT DOCUMENTS

| | | | |
|---|---|---|---|
| 4,294,621 | 10/1981 | Maurer et al. | 106/306 |
| 5,034,109 | 7/1991 | Fujibayashi et al. | 204/499 |
| 5,369,151 | 11/1994 | Fujibayashi et al. | 204/505 |
| 5,587,059 | 12/1996 | Yamoto et al. | 204/505 |
| 5,718,817 | 2/1998 | Bossert et al. | 204/501 |

FOREIGN PATENT DOCUMENTS

| | | |
|---|---|---|
| 17784 | 10/1980 | European Pat. Off. . |
| 195419 | 9/1986 | European Pat. Off. . |
| 2707486 | 8/1977 | Germany . |
| 50-004024 | 2/1975 | Japan . |
| 58-120784 | 7/1983 | Japan . |
| 59-011247 | 1/1984 | Japan . |
| 61-136466 | 6/1986 | Japan . |
| 5-059302 | 3/1993 | Japan . |
| 5-140487 | 6/1993 | Japan . |
| 5-345991 | 12/1993 | Japan . |
| WO 89/05839 | 6/1989 | WIPO . |

*Primary Examiner*—Kishor Mayekar
*Attorney, Agent, or Firm*—William J. Uhl

[57] ABSTRACT

Disclosed are improved electrodeposition bath compositions comprising a resinous phase dispersed in an aqueous medium, the resinous phase being comprised of an active hydrogen containing ionic electrodepositable resin and a curing agent, where the improvement comprises the addition to a lead-free electrodeposition bath of at least one calcium compound in an amount of about 10 to 10,000 parts per million of total calcium and not more than about 200 parts per million soluble calcium, based on electrodeposition bath weight. The electrodeposition bath compositions are preferably cationic and provide for excellent corrosion resistance over a variety of metal substrates including untreated steel. Also disclosed is a method of electrocoating a conductive substrate using the improved electrodeposition bath compositions of the invention. Metallic substrates which are coated using the method of the invention are also disclosed.

20 Claims, No Drawings

ELECTRODEPOSITION BATHS CONTAINING CALCIUM SALTS

BACKGROUND OF THE INVENTION

The present invention relates to improved lead-free electrodeposition baths containing a resinous phase dispersed in an aqueous medium, the resinous phase comprised of an ionic electrodepositable resin, a curing agent therefor, and a calcium compound present in a specified amount; and to their use in the method of electrodeposition. More particularly, this invention relates to electrodeposition baths which provide improved corrosion resistance, especially for untreated steel substrates.

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

Typically, electrodepositable coatings comprise an electrodepositable film-forming polymer and a curing agent, in combination with, inter alia, pigments. Lead-containing pigments such as lead silica chromate, basic lead silicate, lead chromate, and lead sulfate are often used in electrodepositable coatings because they impart excellent corrosion resistance to the electrocoated article. However, the acid used in cationic electrodeposition baths often solubilizes a portion of the lead pigment forming lead salts which are soluble in the aqueous phase of the electrodeposition bath. These lead salts often find their way into the ultrafiltrate of the bath, thus necessitating the removal and subsequent disposal of metallic lead and/or ionic or organic lead-containing materials.

In recent years, due to environmental concerns, particularly in Europe and Japan, the use of lead-free coatings has been mandated. Although surface coatings of excellent quality can be achieved by means of cationic electrodeposition of lead-free coatings, the removal of corrosion inhibitive lead pigments can result in poor corrosion resistance of these coatings, particularly when applied to untreated steel substrates.

The use of calcium-containing pigments to improve corrosion resistance of coatings is well known in the art. However, the effectiveness of calcium in the cationic electrodeposition of lead-free coatings is not known. It, therefore, would be advantageous to provide a lead-free electrodeposition bath which provides improved corrosion resistance of the electrocoated metal substrates, especially untreated steel.

SUMMARY OF THE INVENTION

In accordance with the present invention, a lead-free electrodeposition bath, having improved corrosion resistance, comprising a resinous phase dispersed in an aqueous medium is provided. The resinous phase comprises the following components:

(a) an active hydrogen-group containing ionic electrodepositable resin, and (b) a curing agent having functional groups reactive with the active hydrogen groups of (a).

The improvement comprises the inclusion in the electrodeposition bath of a calcium compound present in an amount from about 10 to about 10,000 parts per million of total calcium and not more than about 200 parts per million soluble calcium, based on electrodeposition bath weight.

Also provided is a method of electrocoating a conductive substrate serving as a charged electrode in an electrical circuit comprising the electrode and an oppositely charged counter electrode which are immersed in an aqueous electrodeposition bath described above, and metallic substrates coated by the method.

DETAILED DESCRIPTION OF THE INVENTION

Generally, the electrodeposition bath of the present invention comprises a resinous phase dispersed in an aqueous medium wherein the resinous phase comprises the following components:

(a) an active hydrogen group-containing ionic electrodepositable resin, and (b) a curing agent having functional groups reactive with the active hydrogen groups of (a), wherein the improvement comprises a lead-free electrodeposition bath containing at least one calcium compound present in an amount from about 10 to about 10,000 parts per million, preferably not more than about 5,000 parts per million, and more preferably not more than about 1,000 parts per million, of total calcium, and not more than about 200 parts per million, preferably not more than about 75 parts per million, and more preferably not more than 50 parts per million soluble calcium, based on electrodeposition bath weight.

At levels lower than 10 parts per million total calcium, based on electrodeposition bath weight, no appreciable improvement in corrosion resistance of the electrocoated substrate is observed. At levels of higher than about 200 parts per million soluble calcium, based on electrodeposition bath weight, appearance of the electrocoated substrate is unacceptable due to surface roughness believed to be the result of pinholing caused by gas evolution at the cathode.

By "total calcium" is meant the total amount of non-dissociated calcium present in the form of soluble and/or insoluble calcium compounds. By "soluble calcium" is meant calcium ion, that is $Ca^{+2}$, resulting from the dissociation of the calcium compound in the aqueous electrodeposition bath. By "soluble calcium compound" is meant a calcium compound capable of substantially complete dissociation in aqueous media, and by "insoluble calcium compound" is meant a calcium compound capable of only partial dissociation in aqueous media.

Examples of soluble calcium compounds suitable for use in the lead-free electrodeposition bath of the present invention are organic and inorganic calcium salts such as calcium acetate, calcium chloride, calcium formate, and calcium nitrate. Calcium acetate is the preferred soluble calcium compound. Examples of insoluble calcium compounds suitable for use in the electrodeposition baths of the present invention are organic and inorganic calcium salts such as calcium oxalate, calcium molybdate, calcium titanate and calcium fluorosilicate. Calcium oxalate is the preferred insoluble calcium compound. Calcium can also be present in the form of a calcium pigment such as calcium carbonate.

Besides the aforementioned calcium compounds and pigments, the electrodeposition baths of the present invention also contain, as a main film-forming polymer, an active hydrogen-containing ionic, preferably cationic, electrodepositable resin. A wide variety of electrodepositable film-forming polymers are known and can be used in the electrodeposition baths of the invention so long as the polymers are "water dispersible," i.e., adapted to be solubilized, dispersed or emulsified in water. The water dispersible polymer is ionic in nature, that is, the polymer will contain anionic functional groups to impart a negative charge or, as is preferred, cationic functional groups to impart a positive charge.

Examples of film-forming resins suitable for use in anionic electrodeposition bath compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another suitable electrodepositable resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, all of which are herein incorporated by reference. Other acid functional polymers can also be used such as phosphatized polyepoxide or phosphatized acrylic polymers as are well known to those skilled in the art.

As aforementioned, it is preferred that the active hydrogen-containing ionic electrodepositable resin (a) is cationic and capable of deposition on a cathode. Examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Also, film-forming resins which cure via transesterification such as described in European Application No. 12463 can be used. Further, cationic compositions prepared from Mannich bases such as described in U.S. Pat. No. 4,134,932 can be used.

The resins to which the present invention is particularly effective are those positively charged resins which contain primary and/or secondary amine groups. Such resins are described in U.S. Pat. Nos. 3,663,389; 3,947,339; and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

The active hydrogen-containing ionic electrodepositable resin described above is present in the electrodeposition bath of the invention in amounts of about 1 to about 60 percent by weight, preferably about 5 to about 25 based on total weight of the electrodeposition bath.

The resinous phase of the electrodeposition bath of the present invention further comprises (b) a curing agent adapted to react with the active hydrogen groups of the ionic electrodepositable resin (a) described immediately above. Both blocked organic polyisocyanate and aminoplast curing agents are suitable for use in the present invention, although blocked isocyanates are preferred herein for cathodic electrodeposition.

Aminoplast resins, which are the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from American Cyanamid Co. under the trademark CYMEL and from Monsanto Chemical Co. under the trademark RESIMENE.

The aminoplast curing agents are typically utilized in conjunction with the active hydrogen containing anionic electrodepositable resin in amounts ranging from about 5 percent to about 60 percent by weight, preferably from about 20 percent to about 40 percent by weight, the percentages based on the total weight of the resin solids in the electrodeposition bath.

The preferred curing agents for use in cathodic electrodeposition are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from about 5 percent to about 60 percent by weight, preferably from about 20 percent to about 50 percent by weight, the percentages based on the total weight of the resin solids of the electrodeposition bath.

The aqueous compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

Electrodeposition baths of the invention are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

It should be appreciated that there are various methods by which the calcium compound can be incorporated into the electrodeposition bath. The soluble calcium compound may be added "neat," that is, added directly to the bath without prior blending or reacting with other components. Alternatively, the soluble calcium compound can be added to the predispersed clear resin feed which may include the ionic resin, the curing agent and/or any other non-pigmented component. Preferably, the soluble calcium compound is added "neat" to the electrodeposition bath. The insoluble calcium compound and/or calcium pigments, on the other hand, are pre-blended with the pigment paste component prior to the incorporation of the paste to the electrodeposition bath.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The electrodepositable coating compositions of the present invention can be applied by electrodeposition to a variety of electroconductive substrates especially metals such as untreated steel, galvanized steel, aluminum, copper, magnesium and conductive carbon coated materials. The applied voltage for electrodeposition may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures such as about 90° to about 260° C. for about 1 to about 40 minutes.

Illustrating the invention are the following examples which, however, are not to be considered as limiting the invention to their details. All parts and percentages in the following examples as well as throughout the specification are by weight unless otherwise indicated.

EXAMPLES

Examples A and B describe the preparation of cationic electrodepositable resins. Example A also contains a polyurethane crosslinker. Examples C and D each describes the preparation of quaternary ammonium salt containing pigment grinding resins.

Example AA describes the preparation of a pigment paste suitable for use in the electrodeposition bath compositions of the invention. Examples BB and CC describe the preparation of electrodeposition bath premixes for use in the electrodeposition bath compositions of Examples 1 through 5, and Examples 6 through 8, respectively. Example DD describes the preparation of the soluble calcium solution for use in the bath compositions of Examples 1 through 5, while Example EE describes the preparation of the soluble calcium solutions for use in the bath compositions of Comparative Examples 6 through 8. Table 1 illustrates the improvement in scribe creep corrosion resistance observed with the inclusion of soluble calcium solution in lead-free electrodeposition bath compositions of the invention.

Example FF describes the preparation of an insoluble calcium (calcium oxalate)-containing pigment paste for use in the bath compositions of the invention. Example 9 describes the preparation of a lead-free electrodeposition bath which employs the pigment paste of Example FF. The data reported in Table 2 illustrate the improvement in corrosion resistance over untreated steel substrates observed with the incorporation of an insoluble calcium compound in the lead-free electrodeposition bath compositions of the invention.

Examples 10 through 15 describe the preparation of a series of lead-free electrodeposition bath compositions which contain various levels of total calcium derived from insoluble calcium compounds and commercially available calcium-containing pigments. The data reported in Table 3 illustrate the improvement in corrosion resistance over untreated steel substrates observed with the incorporation of these materials in lead-free electrodeposition bath compositions of the invention.

Example A

A polyurethane crosslinker was prepared from a mixture of the following ingredients:

| INGREDIENTS | WEIGHT (grams) | EQUIVALENTS |
| --- | --- | --- |
| Charge I: | | |
| Trimethylolpropane | 170.8 | 3.821 |
| Ethanol | 439.5 | 9.554 |
| Methanol | 305.6 | 9.550 |
| Propylene glycol | 1161.4 | — |
| | (15.282 moles) | |
| Methyl isobutyl ketone | 710.8 | — |
| Charge II: | | |
| PAPI 2940[1] | 5042.9 | 38.204 |
| Methyl isobutyl ketone | 1249.3 | — |

[1]Polymeric methylene diphenyl diisocyanate available from The Dow Chemical Co.

Into a suitably equipped 12 liter round-bottom flask were added the ingredients of Charge I. Under mild agitation these ingredients were heated under a nitrogen blanket to a temperature of 50° C. The PAPI 2940 was added gradually over a period of about 2.25 hours with the temperature rising to 110° C., followed by a rinse of about 176.6 grams of the methyl isobutyl ketone. The reaction mixture was held at 110° C. until no isocyanate was detected by infrared spectroscopy. The remaining 1072.7 grams of methyl isobutyl ketone was then added to the reaction mixture, which had a final solids content of about 76.9% (1 hour at 110° C.).

A cationic resin was prepared from a mixture of the following ingredients:

| INGREDIENTS | WEIGHT (grams) | EQUIVALENTS |
| --- | --- | --- |
| Charge I: | | |
| Polyurethane crosslinker as described immediately above | 2825.1 | |
| EPON 880[1] | 1971.6 | 10.487 |
| Bisphenol A | 541.6 | 4.751 |
| BPA/EO adduct[2] | 1260.4 | 2.681 |
| TETRONIC 150R1[3] | 1.7 | — |
| Methyl isobutyl ketone | 127.3 | — |

| INGREDIENTS | WEIGHT (grams) | EQUIVALENTS |
| --- | --- | --- |
| Charge II: | | |
| Aminopropyldiethanolamine[4] | 319.5 | 3.944 |
| Diethanolamine | 103.5 | 0.985 |
| Benzyldimethylamine | 3.9 | — |

[1]Diglycidyl ether of Bisphenol A commercially available from Shell Oil and Chemical Co.
[2]Adduct prepared from 1:2 molar ratio of ethoxylated Bisphenol A (9 moles of ethylene oxide per mole Bisphenol A) and hexahydrophthalic anhydride mixed in the presence of 0.05% triethylamine catalyst and held at 100° C. for 3.5 hours.
[3]Surfactant commercially available from BASF Corp.
[4]Commercially available from Huntsman Corporation.

To a suitably equipped 12 liter round bottom flask were added the ingredients of Charge I. The reaction mixture was stirred under mild agitation and heated under a nitrogen blanket to a temperature of about 50° C., followed by the addition of Charge II. The reaction mixture was allowed to exotherm and after the exotherm had expired, the reaction temperature was adjusted to about 120° to 123° C. and held at that temperature for about 3 hours. The reaction mixture had an epoxy equivalent weight of 21,000 based on solids, an amine content of 0.75 milliequivalents per gram based on solids, and a Gardner-Holdt bubble viscosity of T/U (when reduced to 50% solids with 1-methoxy-2-propanol).

An aqueous dispersion of the cationic resin prepared above was prepared from a mixture of the following ingredients:

| INGREDIENTS: | WEIGHT (grams) | EQUIVALENTS |
| --- | --- | --- |
| Charge I: | | |
| Sulfamic acid | 143.5 | 1.478 |
| RHODAMEEN C-5[1] | 59.4 | — |
| Phosphoric acid solution[2] | 4.2 | — |
| Deionized water | 6484.9 | — |
| Charge II: | | |
| Cationic resin prepared immediately above | 6900.0 | |
| Gum rosin[3] | 206.3 | |
| Deionized water | 3185.9 | |

[1]Ethoxylated cocoamine surfactant available form Rhone-Poulenc, USA.
[2]Solution of 16.14 grams of 85% 0-phosphoric acid in 340.78 grams deionized water.
[3]30% solution of gum rosin (commercially available from Aldrich Chemical Company) in methyl isobutyl ketone.

Charge I was added to a bath equipped with an agitator and heated to a temperature of 50° C. At this temperature, the cationic resin was added and mixed for about 20 minutes until thoroughly dispersed, at which time deionized water was gradually added. The dispersion was heated to a temperature of about 60° to 65° C. and subjected to a reduced pressure of about 20 inches mercury over a period of about 2 hours during which time the methyl isobutyl ketone was removed by vacuum distillation. The resulting dispersion had a solids of 41.9% (1 hour at 110° C.)

Example B

A cationic resin was prepared from a mixture of the following ingredients:

| INGREDIENTS: | WEIGHT (grams) | EQUIVALENTS |
|---|---|---|
| Charge I: | | |
| EPON 880 | 376.0 | 2.000 |
| Bisphenol A | 148.0 | 1.300 |
| BPA/EO adduct[1] | 5.2 | 0.020 |
| Solvent[2] | 59.6 | |
| Ethyltriphenyl phosphonium iodide | 0.53 | |
| Charge II: | | |
| Methylethanolamine | 0.1 | 0.001 |
| Diketimine[3] | 235.9 | 0.629 |

[1]Adduct of Bisphenol A and a diol containing 6 ethylene oxide, commercially available as MACOL 98A MOD1 from BASF Corp.
[2]Reaction product of 2 moles of diethylene glycol monobutyl ether and 1 mole formaldehyde, 98% active, prepared as described in U.S. Pat. No. 4,891,111 to McCollum et al.
[3]Diketimine derived from diethylene triamine and methyl isobutyl ketone (73% solids in methyl isobutyl ketone), prepared as described in U.S. Pat. No. 3,947,339 to Jerabek et al.

To a suitably equipped 5 liter flask the ingredients of Charge I were added under mild agitation in the order shown above. The reaction mixture was heated to a temperature of 125° C. under a nitrogen blanket, then allowed to exotherm to a temperature of about 145° to 160° C. and subsequently held for one hour at a temperature of about 145° C. The reaction mixture was then cooled to a temperature of about 125° C. at which time the ingredients of Charge II were added and the reaction mixture was held for two additional hours at that temperature. After the hold period, approximately 85% of the reaction product was slowly poured into an acetic acid solution (28.9 g (0.481 equivalents) and 190.0 grams deionized water) and allowed to mix for 30 minutes. Additional deionized water was added to reduce the dispersion solids to 36% (1 hour@ 110° C.). The cationic dispersion was then vacuum stripped to remove methyl isobutyl ketone.

Example C

This examples describes the preparation of a quaternary ammonium salt containing pigment grinding resin. Example C-1 describes the preparation of an amine-acid salt quaternizing agent and Example C-2 describes the preparation of an epoxy group-containing polymer which is subsequently quaternized with the amine-acid salt of Example C-1.

Example C-1

The amine-acid salt quaternizing agent was prepared using the following procedure: to a suitably equipped 5 liter flask were added 445 parts by weight N,N-dimethylethanolamine. Under mild agitation, 660 parts by weight PAPI 2940 (polymeric diisocyanate commercially available from the Dow Chemical Co.) were added slowly over a 1.5 hour period, followed by a rinse of 22.1 parts by weight of the solvent mentioned above for Example B. During this addition, the reaction mixture was allowed to exotherm to a temperature of about 89° C. and held at that temperature for about 1 hour until complete reaction of the isocyanate as determined by infrared spectroscopy. At that time, 512 parts by weight of an 88% aqueous lactic acid solution were added over a 25 minute period, followed by the addition of about 2136.11 parts by weight of deionized water. The reaction temperature was held at about 80° C. for about 6 hours until a stalled acid value of 70.6 was obtained.

Example C-2

The quaternary ammonium salt group-containing polymer was prepared using the following procedure.

To a suitably equipped 5 liter flask were added, under mild agitation, 528.8 parts by weight EPON 828 (polyglycidyl ether of Bisphenol A commercially available from Shell Oil and Chemical Co.); 224.9 parts by weight of Bisphenol A; 83.7 parts by weight of the solvent mentioned above in Example B; and 0.5 parts by weight of ethyltriphenylphosphonium iodide. The reaction mixture was heated to about 140° C., allowed to exotherm to about 180° C., then cooled to about 160° C. and held at that temperature for about 1 hour at which time the polymeric product had an epoxy equivalent weight of 982.9. The reaction mixture was then cooled to a temperature of about 130° C. at which time about 164.9 parts by weight of the solvent of Example B were added and the temperature lowered to about 95–100° C., followed by the addition of about 418.4 parts by weight of the amine-acid quaternizing agent of Example C-1 over a period of 15 minutes, and subsequently followed by the addition of about 1428.1 parts by weight of deionized water. The reaction temperature was held at about 80° C. for approximately 6 hours until the acid number of the reaction product fell below 1.0. The resultant quaternary ammonium salt group-containing pigment grinding resin was further reduced with about 334.7 parts by weight of the solvent of Example B.

Example D

This example describes the preparation of a second quaternary ammonium salt group-containing pigment grinding resin. Example D-1 describes the preparation of an amine-acid salt quaternizing agent and Example D-2 describes the preparation of an epoxy group-containing polymer which is subsequently quaternized with the amine-acid salt of Example D-1.

Example D-1

The amine-acid salt quaternizing agent was prepared using the following procedure.

To a suitably equipped 5 liter flask were added under agitation 267.4 parts by weight N,N-dimethylethanolamine. At a temperature of about 23° C., 396 parts by weight of PAPI 2940 were slowly added over a 1.0 hour period, followed by a rinse of about 13.9 parts by weight of the solvent mentioned above in Example B. The temperature was allowed to exotherm to about 90° C. during this addition and was subsequently held at that temperature for about 45 minutes until the disappearance of the isocyanate as determined by infrared Cspectroscopy. At that time, 112.8 parts by weight of dimethylcocoamine were added followed by the addition of about 361.3 parts by weight of 88% aqueous lactic acid solution over a 15 minute period. About 695.0 parts by weight of deionized water were then added and the reaction temperature was held at about 85° C. for about 3 hours until a stalled acid value was obtained.

Example D-2

The quaternary ammonium salt group-containing polymer was prepared using the following procedure.

To a suitably equipped 5 liter flask were added 631.7 parts by weight EPON 828; 268.7 parts by weight Bisphenol A;

10.0 parts by weight of the solvent of Example B; and 0.6 parts of ethyltriphenylphosphonium iodide. The reaction mixture was heated to about 140° C. and allowed to exotherm to a temperature of about 180° C. at which time the reaction mixture was cooled to 160° C. and held for about 1 hour to an epoxy equivalent weight of 991.0. The reaction was further cooled to about 130° C. and 421.2 parts by weight of ethoxylated Bisphenol A (6 moles of ethylene oxide per mole of Bisplienol A) were added. Cooling was then continued until a temperature of about 80° C. was obtained, at which time 346.4 parts by weight of the amine-acid salt quaternizing agent of Example D-1 were added over a period of about 30 to 35 minutes, followed by the addition of 404.8 parts by weight of deionized water. The reaction mixture was held at a temperature of about 80° C. for about 6 hours until the acid number dropped below 1.0. The resultant quaternary ammonium salt group-containing pigment grinding resin was further reduced with 2232.2 parts by weight of deionized water.

Example AA

This example describes the preparation of a pigment paste suitable for use in the electrodeposition bath compositions of the present invention. The pigment paste was prepared from a mixture of the following ingredients:

| INGREDIENTS | WEIGHT (grams) |
| --- | --- |
| Quaternary ammonium salt group-containing grind resin of Example C | 2053.0 |
| Deoinized water | 686.0 |
| TRONOX CR800[1] | 1725.0 |
| CSX-333[2] | 39.0 |
| OK-412[3] | 195.0 |
| Catalyst paste[4] | 545.0 |
| Deionized water | 127.0 |

[1]Titanium dioxide pigment available from Kerr-McGee Co.
[2]Carbon black beads available from Cabot Corp.
[3]Silica commercially available from Degussa Corp.
[4]Catalyst paste prepared from a mixture of the following ingredients:

| INGREDIENTS | WEIGHT (grams) |
| --- | --- |
| Quaternary ammonium salt group-containing grind resin of Example D | 632.0 |
| Deionized water | 92.0 |
| n-Butoxypropanol | 19.0 |
| FASCAT 4201[1] | 368.0 |

[1]Dibutyl tin oxide catalyst available from Elf-Atochem, Inc.

The above ingredients were added, in the order shown, under high shear agitation. After the ingredients were thoroughly blended, the pigment paste was transferred to a vertical sand mill and ground to a Hegman value of about 7.25.

Example BB

This example describes the preparation of an electrodeposition bath premix for use in the electrodeposition bath compositions of Examples 1 through 5 below. The electrodeposition bath premix was prepared from a mixture of the following ingredients:

| INGREDIENTS | WEIGHT (grams) |
| --- | --- |
| Cationic resin of Example A | 4532.7 |
| Cationic resin of Example B | 308.5 |
| Flexibilizer[1] | 419.5 |
| Flow additive[2] | 87.4 |
| Solvent of Example B | 64.2 |
| Pigment paste of Example AA | 950.5 |
| Deionized water | 4637.2 |

[1]Reaction product of JEFFAMINE D400 (polyoxypropylenediamine available from Huntsman Corporation) and DER-732 (aliphatic epoxide commercially available from the Dow Chemical Co), prepared as described in U.S. Pat. No. 4,423,166 to Moriarity et al.
[2]Reaction product of methylamine; propylene oxide; and toluene diisocyanate as described in Example 4 of U.S. Pat. No. 5,348,578.

Example CC

This example describes the preparation of an electrodeposition bath premix for use in the electrodeposition bath compositions of Examples 6 through 8 below. The elecrodeposition bath premix was prepared from a mixture of the following ingredients:

| INGREDIENTS | WEIGHT (grams) |
| --- | --- |
| Cationic resin of Example A | 4532.7 |
| Cationic resin of Example B | 308.5 |
| Flexibilizer of Example BB | 419.5 |
| Flow additive of Example BB | 87.4 |
| Solvent of Example B | 64.2 |
| Pigment paste of Example AA | 950.5 |
| Deionized water | 3637.2 |

Example DD

This example describes the preparation of a soluble calcium solution for use in the electrodeposition bath compositions of the Examples 1 through 5 below. The soluble calcium solution was prepared from a mixture of the following ingredients:

| INGREDIENTS | WEIGHT (grams) |
| --- | --- |
| Calcium acetate[1] | 10.0 |
| Deionized water | 990.0 |

[1]Commercially available from Aldrich Chemical Co.

Example EE

This example describes the preparation of a soluble calcium solution for use in the electrodeposition bath compositions of the Examples 6 through 8 below. The soluble calcium solution was prepared from a mixture of the following ingredients:

| INGREDIENTS | WEIGHT (grams) |
|---|---|
| Calcium acetate | 30.0 |
| Deionized water | 270.0 |

Examples 1–5

Examples 2 through 5 describe the preparation of electrodeposition bath compositions of the invention which contain varying levels of the soluble calcium solution of Example DD. Comparative Example 1 contains no soluble calcium solution. The electrodeposition bath compositions were prepared from a mixture of the following ingredients:

| Ingredients: | EXAMPLE 1 (comparative) 0 ppm soluble calcium: Weight (grams) | EXAMPLE 2 10 Weight (grams) | EXAMPLE 3 25 Weight (grams) | EXAMPLE 4 50 Weight (grams) | EXAMPLE 5 100 Weight (grams) |
|---|---|---|---|---|---|
| Premix of Example BB | 2198.7g. | 2198.7 | 2198.7 | 2198.7 | 2198.7 |
| Calcium solution of Example DD | 0.0 | 11.0 | 26.0 | 53.0 | 116.0 |
| Deionized water | 201.3 | 190.3 | 175.3 | 148.3 | 85.1 |

Comparative Examples 6–8

The following Comparative Examples 6 through 8 describe the reparation of electrodeposition bath compositions of the invention containing, respectively, 200, 400, and 600 parts per million of soluble calcium derived from the soluble calcium solution of Example EE. The electrodeposition bath compositions were prepared from a mixture of the following ingredients:

| ppm soluble calcium: INGREDIENTS: | COMPARATIVE EXAMPLE 6 200 WEIGHT (grams) | COMPARATIVE EXAMPLE 7 400 WEIGHT (grams) | COMPARATIVE EXAMPLE 8 600 WEIGHT (grams) |
|---|---|---|---|
| Premix of Example CC | 2000.0 | 2000.0 | 2000.0 |
| Calcium solution of Example EE | 21.1 | 42.2 | 63.4 |
| Dionized water | 378.9 | 357.8 | 336.6 |

Electrodeposition Bath Preparation:

Under agitation, the cationic resin of Example B was diluted with approximately 15% of the total deionized water. The diluted resin was then stirred into the cationic resin of Example A. The flexibilizer resin was separately diluted with the solvent under agitation, then further diluted with about 30% of the total deionized water before adding to the cationic resin blend. The flow control additive was then added. The pigment paste was separately diluted with the remaining deionized water and added to the above resin blend. After two hours of agitation, the bath premix was further diluted with deionized water and the calcium acetate solution was then added. Final bath solids are about 22%, with a pigment to resin ratio of 0.17: 1.0. The test baths were 15% ultrafiltered and replenished with fresh deionized water before electrocoating.

Electrocoating procedure:

Each of the electrodeposition bath compositions of Examples 1 through 8 above were electrodeposited onto non-phosphated cold rolled steel panels, commercially available from ACT Laboratories. Conditions for cationic electrodeposition of each were as follows: 2 minutes at 90° F. at 170–180 volts to yield a cured film thickness of 0.6 to 0.8 mils. The coated substrate was cured in an electric oven at 340° F. for 20 minutes.

Testing procedure:

Each of the coated untreated steel test panels was scribed, cutting through the coating to the metal, in an "X" pattern. The test panels were then subjected to salt spray testing in accordance with ASTM B117. Test panels were evaluated for "scribe creep" corrosion and visual appearance. Scribe creep is reported as average distance (in millimeters) of corrosion from the scribe mark. Appearance was visually rated for surface roughness and pinholing in the coating surface. Test results are reported in the following TABLE 1.

TABLE 1

| EXAMPLE | 1* | 2 | 3 | 4 | 5 | 6* | 7* | 8* |
|---|---|---|---|---|---|---|---|---|
| Soluble calcium | 0 ppm | 10 ppm | 25 ppm | 50 ppm | 100 ppm | 200 ppm | 400 ppm | 600 ppm |
| Appearance[1] | 10 | 10 | 10 | 10 | 9 | 7 | 3 | 0 |
| Scribe Creep (mm) | 21 | 15 | 12 | 10 | 10 | 8 | — | — |

[1] 10 rating = no defects; 0 rating = rough and pinholed surface
* Comparative examples.

The data reported in the above TABLE 1 illustrate the improvement in scribe creep corrosion resistance observed with the inclusion of soluble calcium solutions in the electrodeposition baths of the invention. Also, the data illustrate that the use of levels 200 parts per million or more of soluble calcium have a detrimental effect on coating appearance.

Example FF

This example describes the preparation of a pigment paste which contains the insoluble calcium compound, calcium oxalate. The pigment paste was prepared from a mixture of the following ingredients:

| INGREDIENTS | WEIGHT (grams) |
| --- | --- |
| Pigment grinding resin of Example C | 520.6 |
| Deionized water | 65.0 |
| TRONOX CR800 | 385.4 |
| CSX-333 | 8.4 |
| Calcium oxalate[1] | 24.9 |
| OK-412 | 45.4 |
| Catalyst paste[2] | 139.7 |
| Deionized water | 84.2 |

[1]Commercially available from Aldrich Chemical Co.
[2]As described in Example AA above.

The above ingredients were added, in the order shown, under high shear agitation. After the ingredients were thoroughly blended, the pigment paste was transferred to a vertical sand mill and ground to a Hegman value of about 7.25.

Example GG

This example describes the preparation of a pigment paste which contains the insoluble calcium compound, calcium zirconium oxide. The pigment paste was prepared from a mixture of the following ingredients:

| INGREDIENTS | WEIGHT (grams) |
| --- | --- |
| Pigment grinding resin of Example C | 285.3 |
| Deionized water | 140.0 |
| R-900-39/76[1] | 36.3 |
| CSX-333 | 5.4 |
| Calcium zirconium oxide[2] | 191.0 |
| OK-412 | 45.4 |
| Catalyst paste[3] | 78.7 |
| Deionized water | 40.0 |

[1]Titanium dioxide pigment available from E. I. duPont de Nemours & Co.
[2]Commercially available from Alfa Aesar Co.
[3]As described in Example AA above.

The above ingredients were added, in the order shown, under high shear agitation. After the ingredients were thoroughly blended, the pigment paste was transferred to a vertical sand mill and ground to a Hegman value of about 7.25.

Example 9

This example describes the preparation two electrodeposition bath compositions of the invention, Example 9-I and Example 9-II, which contain the insoluble calcium compounds calcium oxalate and calcium zirconium oxide, respectively. The insoluble calcium compounds were in incorporated in the baths via the pigment paste. The electrodeposition bath compositions were prepared from a mixture of the following ingredients:

| INGREDIENTS | EXAMPLE 9-I (grams) | EXAMPLE 9-II (grams) |
| --- | --- | --- |
| Cationic resin of Example A | 797.4 | 807.6 |
| Cationic resin of Example B | 58.8 | 58.2 |
| Flexibilizer of Example BB | 72.7 | 78.8 |
| Solvent of Example B | 10.8 | 11.6 |
| Flow additive of Example BB | 16.7 | 16.4 |
| Deionized water | 1052.0 | 1022.0 |
| Pigment paste of Example FF | 190.6 | — |
| Pigment paste of Example GG | — | 205.4 |

The electrodeposition bath composition of Example 9-I and 9-II were prepared as generally described above for the Examples 1 through 8 with the exception that no soluble calcium compound was added. Untreated cold rolled steel substrates were electrocoated and subsequently tested using the procedure generally described above for Examples 1 through 8. The test panels were compared for appearance rating and scribe creep corrosion resistance versus the comparative bath composition of Example 1 which contained no calcium compound. Test results are reported in the following TABLE 2.

TABLE 2

| EXAMPLE | 1 | 9-I | 9-II |
| --- | --- | --- | --- |
| Total calcium (ppm) | 0 | 534 | 5000 |
| Appearance | 10 | 10 | 7 |
| Scribe creep (mm) | 21 | 10 | 12 |

The data reported above in Table 2 illustrate the improvement in scribe creep corrosion resistance observed with the incorporation of a relatively high level (i.e., about 500 ppm) of total calcium in the electrocoating bath compositions of the invention, without having a detrimental effect on appearance of the resultant coating. The data also illustrate that at very high level of total calcium (i.e., about 5000 ppm) appearance properties of the resultant coating begin to degrade.

Examples 10–15

Examples 10 through 15 describe the preparation of a series of electrodeposition bath compositions containing various commercial calcium containing pigments or pure calcium salts. The bath compositions were prepared as described above for Example 9. Untreated cold rolled steel test panels were electrocoated and tested as described above for the compositions of Examples 1 through 8. Test results are reported in the following TABLE 3.

TABLE 3

| EXAMPLE | Calcium Pigment | Total Calcium (ppm) | Appearance | Scribe Creep |
| --- | --- | --- | --- | --- |
| 1 | None | 0 | 10 | 21 |
| 10 | Calcium molybdate[1] | 342 | 10 | 13 |
| 11 | Calcium titanate[2] | 503 | 10 | 11 |
| 12 | Calcium fluoride[3] | 877 | 10 | 14 |
| 13 | INHIBISIL BXS-622[4] | — | 10 | 8 |

TABLE 3-continued

| EXAMPLE | Calcium Pigment | Total Calcium (ppm) | Appearance | Scribe Creep |
|---|---|---|---|---|
| 14 | WAYNCOR 204[5] | 155 | 9 | 6 |
| 15 | HEUCOPHOS CAPP[6] | — | 10 | 9 |

[1]Commercially available from Aldrich Chemical Co.
[2]Commercially available from Aldrich Chemical Co.
[3]Commercially available from Aldrich Chemical Co.
[4]Calcium containing pigment available from PPG Industries, Inc.
[5]Calcium containing pigment available from Wayne Pigment Co.
[6]Calcium containing pigment available from Dr. Rans Heubach GmbH & Co.

We claim:

1. in an electrodeposition bath, said electrodeposition bath comprising a resinous phase dispersed in an aqueous medium, said resinous phase comprising:
   (a) an active hydrogen group-containing ionic electrodepositable resin, and
   (b) a curing agent having functional groups reactive with the active hydrogen groups of (a),
   the improvement comprising a lead-free electrodeposition bath containing at least one calcium compound present in an amount from about 10 parts per million to about 10,000 parts per million of total calcium provided that not more than about 200 parts per million is in the form of soluble calcium, based on electrodeposition bath weight.

2. The electrodeposition bath of claim 1 wherein the amount of soluble calcium is not more than about 50 parts per million, based on electrodeposition bath weight.

3. The electrodeposition bath of claim 1 where in the amount of total calcium is not more than about 5,000 parts per million, based on electrodeposition weight.

4. The electrodeposition bath of claim 1 wherein the amount of total calcium is not more than about 1,000 parts per million, based on electrodeposition weight.

5. The electrodeposition bath of claim 1 wherein said resinous phase further comprises at least one non-lead pigment.

6. The electrodeposition bath of claim 1 wherein said calcium compound is calcium acetate.

7. The electrodeposition bath of claim 1 wherein said calcium compound is calcium oxalate.

8. The electrodeposition bath of claim 1 wherein said active hydrogen containing ionic resin is cationic.

9. The electrodeposition bath of claim 1 wherein the amount of soluble calcium is not more than about 50 parts per million soluble calcium based on electrodeposition bath weight.

10. A method of electrocoating a conductive substrate serving as a charged electrode in an electrical circuit comprising said electrode and an oppositely charged counter electrode, said electrodes being immersed in an aqueous electrocoating composition, comprising passing electric current between said electrodes to cause deposition of the electrocoating composition on the substrate as a substantially continuous film, the aqueous electrocoating composition comprising:
   (a) an active hydrogen group-containing ionic electrodepositable resin, and
   (b) a curing agent having functional groups reactive with the active hydrogen groups of (a),
   wherein the improvement comprises a lead-free electrodeposition bath containing at least one calcium compound present in an amount from about 10 parts per million to about 10,000 parts per million of total calcium provided that not more than about 200 parts per million is present in the form of soluble calcium, based on electrodeposition bath weight.

11. The method of claim 10 wherein the amount of soluble calcium is not more than about 50 parts per million soluble calcium, based on electrodeposition bath weight.

12. The method of claim 10 wherein the amount of total calcium is not more than about 5,000 parts per million, based on electrodeposition bath weight.

13. The method of claim 10 wherein the amount of total calcium is not more than about 1,000 parts per million, based on electrodeposition bath weight.

14. The method of claim 10 wherein said resinous phase further comprises at least one non-lead pigment.

15. The method of claim 10 wherein said calcium compound is calcium acetate.

16. The method of claim 10 wherein said calcium compound is calcium oxalate.

17. The method of claim 10 wherein the substrate is the cathode.

18. The method of claim 10 wherein said substrate is comprised of untreated steel.

19. The method of claim 10 wherein said substrate is comprised of galvanized steel.

20. The method of claim 10 wherein said substrate is comprised of aluminum.

* * * * *